US005137233A

United States Patent [19]

Maimon et al.

[11] Patent Number: 5,137,233

[45] Date of Patent: Aug. 11, 1992

[54] AVIATIONAL SPRAYING

[75] Inventors: Nissim Maimon, Netanya; David Shavit, Kibbutz Na'an, both of Israel

[73] Assignee: Chimavir Agricultural Cooperative Association Ltd., Tel Aviv, Israel

[21] Appl. No.: 630,074

[22] Filed: Dec. 19, 1990

[30] Foreign Application Priority Data

Dec. 22, 1989 [IL] Israel .......................................... 92848

[51] Int. Cl.[5] .............................................. B64D 1/18

[52] U.S. Cl. ...................................... 244/136; 239/171

[58] Field of Search ......................... 244/136; 239/171; 1/524

[56] References Cited

U.S. PATENT DOCUMENTS

| | | | |
|---|---|---|---|
| 2,127,275 | 8/1938 | Streif et al. | 244/136 |
| 2,427,987 | 9/1947 | Wilson | 244/136 |
| 2,582,678 | 1/1952 | Carberry | 244/136 |
| 2,730,402 | 1/1956 | Whiting, Jr. et al. | 244/136 |
| 2,812,913 | 11/1957 | Nissen | 244/136 |
| 2,986,360 | 5/1961 | Rutten | 244/136 |
| 3,533,582 | 10/1970 | Roth | 244/136 |
| 4,180,224 | 12/1979 | Ryle, Jr. | 244/136 |
| 4,260,108 | 4/1981 | Maedgen, Jr. | 244/136 |
| 4,560,107 | 12/1985 | Inculet | 244/136 |
| 4,694,991 | 9/1987 | Breckenridge | 244/136 |

*Primary Examiner*—Joseph F. Peters, Jr.
*Assistant Examiner*—Anne E. Bidwell
*Attorney, Agent, or Firm*—Norbert P. Holler

[57] ABSTRACT

A method of aerial spraying of crops by airplanes mounted with spray jets below and trailing the wings is disclosed. The method comprises the steps of directing the spray jets at an acute angle with respect to the lower plane of the wing against a winglet deflection surface of covex shape. The winglet extends at a level distanced from the jet and tilted by an accute tangential angle with respect to the plane of the wing. An airplane mounted with a device for effecting crop spraying according to the method is disclosed as well.

12 Claims, 5 Drawing Sheets

FIG. 1
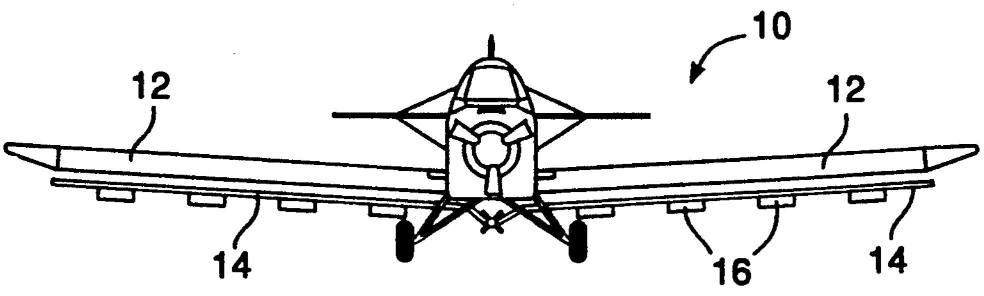
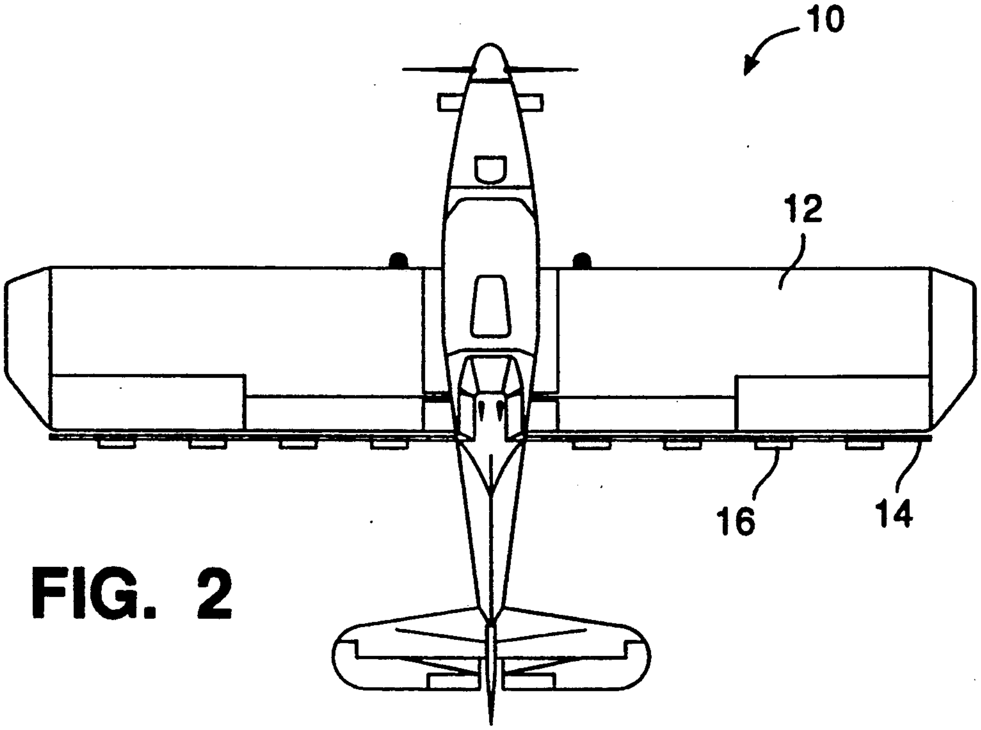
FIG. 2
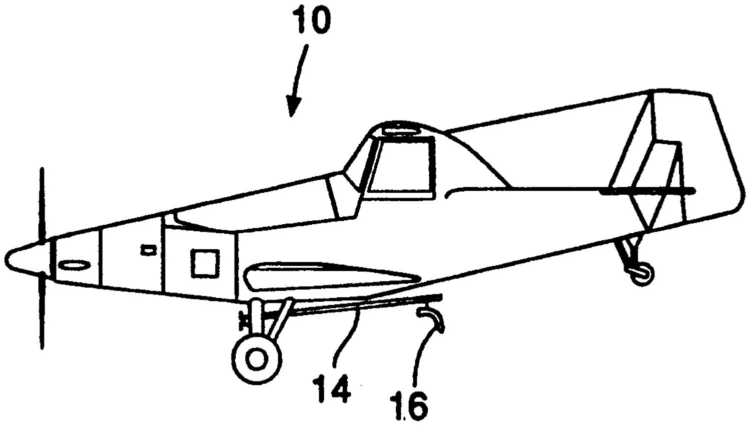
FIG. 3

FIG. 7
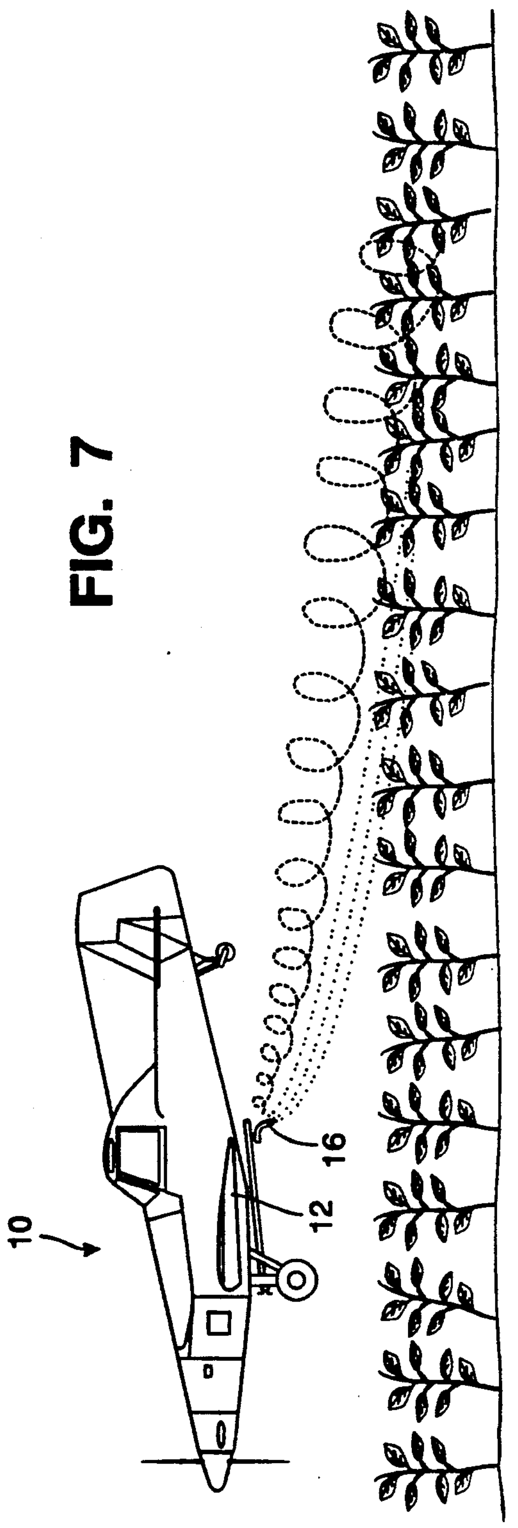
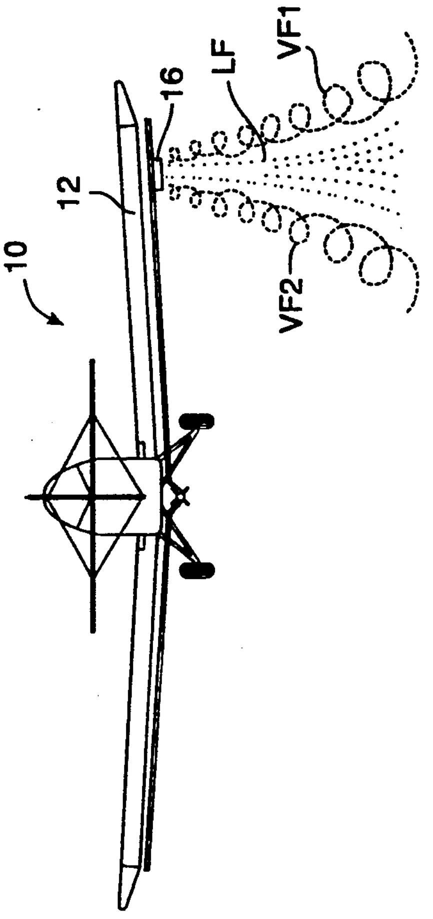
FIG. 8

AVIATIONAL SPRAYING

BACKGROUND OF THE INVENTION

The present invention relates to the art of aviational spraying of agricultural crops.

Spraying of agricultural crops by airplanes is traditionally known and is performed by a light airplane flying low over a field and releasing therebehind a "vapour trail" of fine droplets of a chemical preparation such as insecticide. The spraying is effected by a series of especially designed spraying jets, the jets being mounted to and in communication with an elongated spray boom, carrying the chemical preparation in liquid form. The boom extends alongside and somewhat lower than the trailing edge of both airplane wings.

It has been already recognized that the conventional method of airborne spraying—despite its obvious advantages—is in some respects less effective than the manual or vehicular, on-site spraying methods, whereby the chemical preparations are directly applied to the desired location around the stems of the crop.

Thus, in aviational spraying considerable proportions of the total quantity of chemical preparation sprayed in the vapour trail are often blown off target, i.e. away from the area to be sprayed, by prevailing breezes, the occurrence of which not only results in a waste of costly materials and time, but also has a negative ecological impact on and may damage neighboring fields, particularly in cases where herbicides are sprayed.

Secondly, since the droplets descend by gravity only, a significant amount thereof merely rests on the leaves or the boughs of the plants, rather than penetrates down to the ground, near the crop stems as required for insecticidal or other effects.

SUMMARY OF INVENTION

It is therefore the general object of the invention to provide a method of aviational spraying of agricultural crops in the form of a vapour trail of droplets, that will increase the percentage of droplets penetrating crop foliage to settle in the desired location on the ground around the crop stems.

It is a further object of the invention to afford a transporting air stream for the sprayed vapour trail of droplets, having a downwardly directed inverted vortical path—similar to a whirlwind—thereby causing a higher proportion of the droplets to penetrate within the foliage canopy and possibly also to settle on the bottom, face-down sides of the crop leaves—a matter of great importance for treating certain kinds of plant diseases.

It is a still further object of the invention to reduce the quantity of chemical preparation required for the airborne spraying of a given area.

It is yet a further object of the invention to provide an aviational crop-spraying method being less dependent on prevailing weather conditions so that it may therefore be more safely applied.

Extensive experimentation by the applicants has proven that the most effective way of attaining these goals involves the use of a deflection surface, or winglet, affixed at a distance from the spray nozzle jets, so that the mist of droplets becomes deflected by the turbulence (Venturi effect) of the trailing airstream passing over, below and through the winglet (see below), thus transforming the ordinarily straight descent by gravity of the vapour trail into a whirling, inverted vortical path of progressively increasing radii as the droplets approach ground level.

It is thus provided according to the present invention a method of aviational spraying of crops by airplanes with spray jets provided behind and below the airplane wings, comprising the steps of directing the spray jets at an angle of preferably between 60-75 degrees with respect to the lower wing plane, against a winglet comprising a convex deflection surface having a radius of curvature of preferably between 20-40 cm., extending at a level distanced from the jet and tilted by a tangential angle of 15-30 degrees with respect to the said wing plane.

The width of the deflection surface is preferably between 30-100 cm, a plurality of such surfaces being provided underneath a series of alligned spray jets.

Still more advantageously, the said deflection surface constitutes the top wall of a convergent tunnel comprising a bottom wall conforming to the shape of and extending distantly from the top wall, and two opposite, planar side walls, so that rectangular inlet and outlet openings are defined.

The cross-sectional area of the inlet opening should preferably be about twice the cross-sectional area of the outlet opening.

For attaining a better understanding of the present invention, reference shall be made to the accompanying drawings, illustrating a preferred application and embodiment thereof.

BRIEF DESCRIPTION OF THE DRAWINGS

FIG. 1 is an elevational view of an airplane provided with deflector winglets according to the invention;

FIG. 2 is a top view of the airplane of FIG. 1;

FIG. 3 is a side view of the airplane of FIG. 1;

FIG. 7 diagrammatically illustrates the vapour trail extending in the wake of a winglet and the spiralling vortical path by virtue of which the droplets penetrate through crop foliage;

FIG. 8 shows the airplane of FIG. 7 from the rear; and

DETAILED DESCRIPTION OF THE INVENTION

As shown in FIGS. 1-3, a spraying airplane 10, having a pair of wings 12 and a conventionally installed spray boom 14 with associated spray jets (or nozzles not shown), is provided with a plurality of winglets 16 deployed along the boom 14 in a manner and according to the design considerations as will be described in more detail below.

Figure 4:
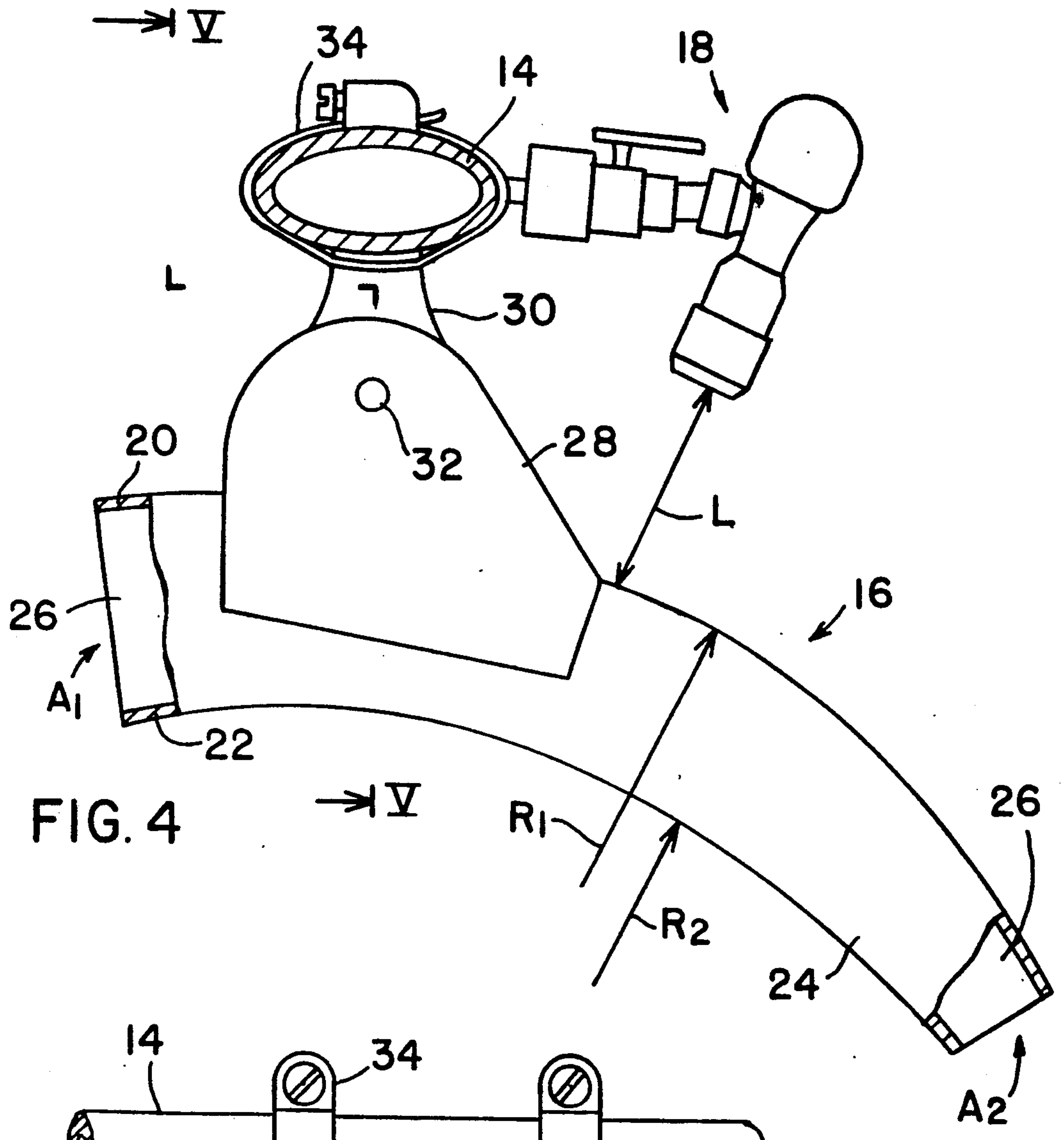
FIG. 4 is a side view of a spraying jet with its associated wiglet.
Figure 5:
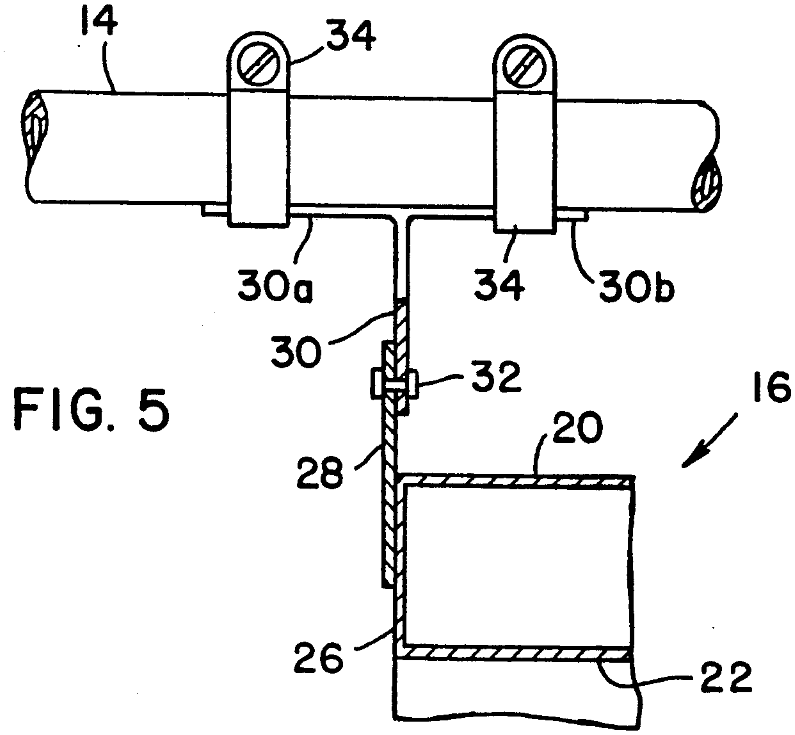
FIG. 5 is a view taken along line V—V of FIG. 4.

Hence, as seen in more detail in FIGS. 4 and 5, the plane boom 14 carries the liquid chemical preparation to a plurality of spray jets, generally denoted 18, of conventional design and therefore not described in greater detail.

Although the effect, forming the ultimate object of the invention, is most advantageously achieved using a hollow, double-wall, convergent, duct-like winglet 16 as shown in FIG. 4 and described below—it should be noted that essentially, it may also be attained by providing only a single deflection surface, namely a convex flap 20 extending underneath the orifice of the jet 18 normal to the spraying direction thereof.

Thus, the winglet 16 consists of a curved duct, made of sheet metal, comprising the upper wall 20, a lower wall 22 and two planar side walls 24 and 26. A pair of ears 28 (only one appearing in the FIGS.) are fixed to the side walls, connected to a bracket 30 by a rivet or bolt 32. The bracket 30 is T-shaped, whereby its two arms 30*a* and 30*b* are used to tighten the winglet 16 to the boom 14, e.g. by a pair of standard traction bands 34, as shown. Any other suitable mounting method is, of course, applicable.

Figure 6:
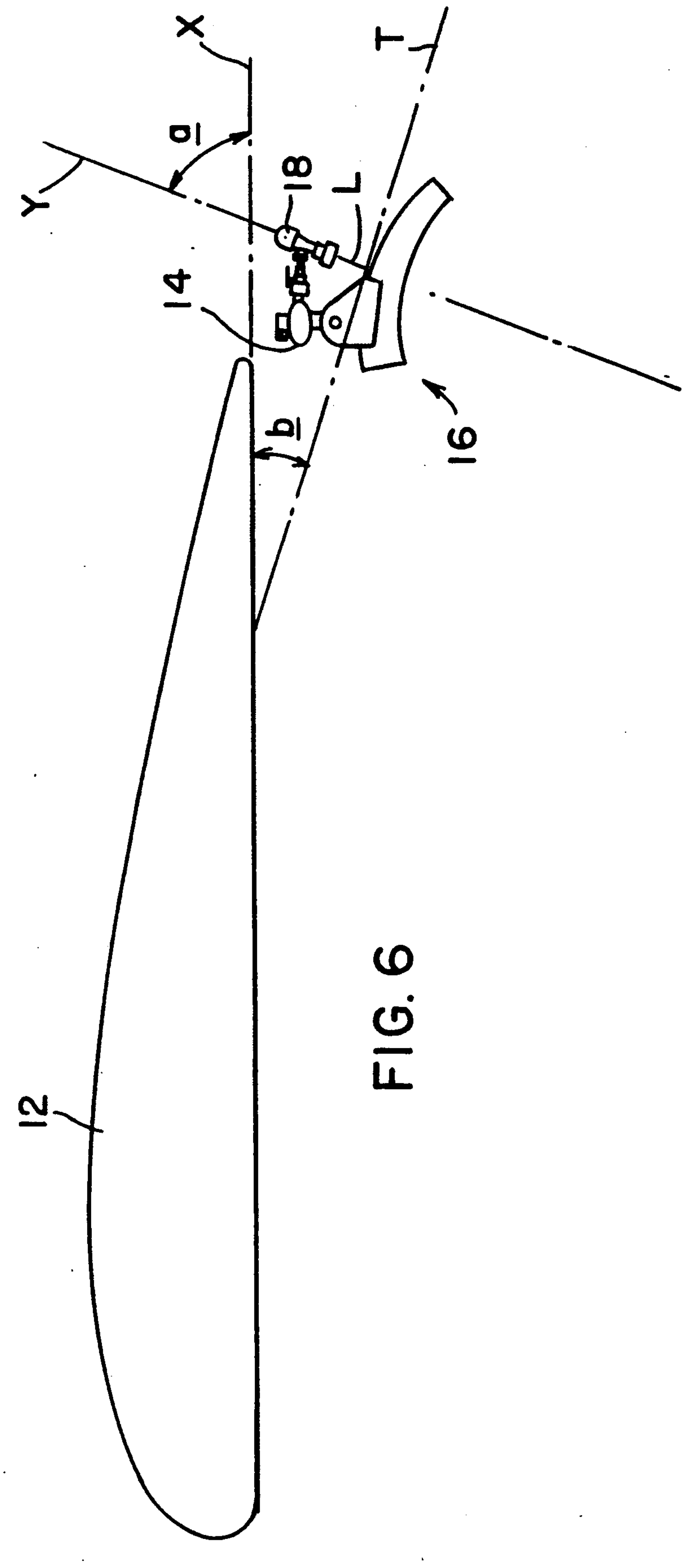
FIG. 6 illustrates the location and allignment of the spray jet and associated winglet with respect to the airplane wing.

It has been found that the following relative distances, inclinations and dimensions of the winglet and nozzle with respect to each other and to the wing of the airplane should be kept for attaining best results (see also FIG. 6): The radius of curvatures R1 of the wall 20 is about 10% greater than the radius R2 of the wall 22, both being in the range of 20–40 cm.; the cross-sectional area A1 of the inlet opening is about twice the area A2; the width of the winglet is about 70 cm.; the distance L between the outlet of the nozzle of the sprayer 18 and the upper surface of the winglet wall 20 is about 7 cm.; the angle a between the axis Y of the jet 18 and the plane X of the lower wing surface is between 60 and 75 degrees; and the angle b between the plane X and the tangent T is between 15 and 30 degrees.

Referring now to FIGS. 7 and 8, there is shown the airplane 10 fitted out with the conventional spraying equipment modified in accordance with the teachings of the present invention, namely the addition of winglet 16 (only one being shown), and the resulting downwardly directed vapour trail in its wake.

Figure 9:
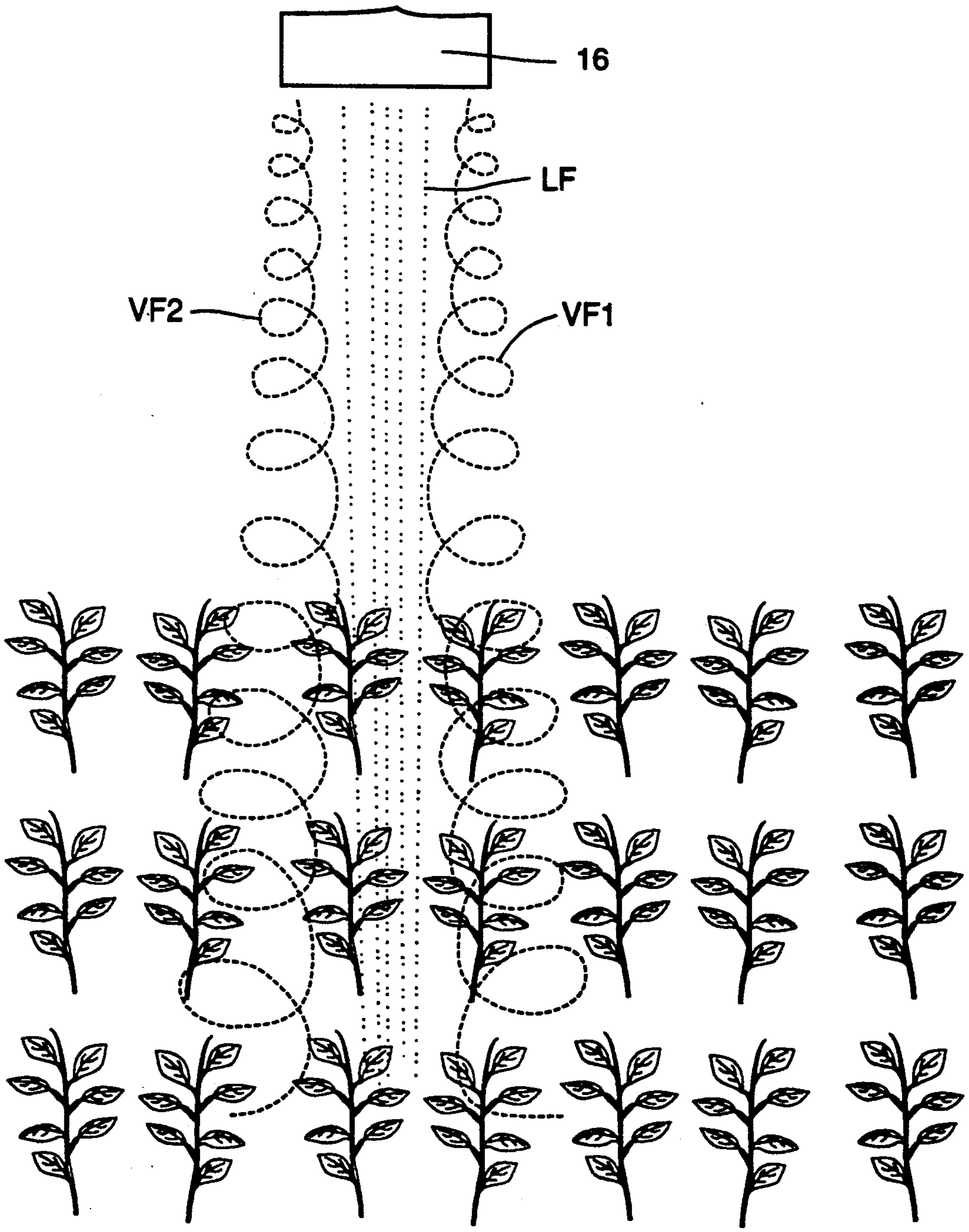
FIG. 9 is an enlarged schematical view of the droplets path penetrating through the foliage canopy down to the ground.

As still more vividly shown in FIG. 9, the formation of the droplet-transporting air-stream extending from the trailing edge of the winglet 16—and hence the vapour trail of the droplets—comprises a relatively minor laminar flow LF over the middle portion, and swirling, vortical flows VF1 and VF2 along the two sides thereof. As can be clearly seen, the vortical air-streams have increasing radii as the droplets approach the ground, thereby enabling the droplets to penetrate the foliage canopy to a far greater degree to ultimately rest at their designated destination on the ground close to the crop stems. Moreover, a certain portion of the spiraling droplets reach from below to settle on the face-down sides of the leaves.

It will thus be recognised that by attaching simple, inexpensive-to-produce, winglets—which, in effect, in their simplest form are profiled, metal flaps—to existing spraying equipment, considerable savings of costly chemical preparation (and even flying time) is achieved, besides—and more importantly—the crops being more effectively treated by the chemical preparation.

It should be noted that the additional frictional resistance or drag generated by the winglets is so insignificant so as to have a negligible effect on the flying characteristics of the airplane.

Although the invention has been described with reference to crop spraying, it will be readily understood that it can be applied to other uses in aviational spraying, e.g. to cross-pollinization of fruit trees, where pollinization is usually not perfected by natural means (e.g. in Avocado plantations).

Those skilled in the art will readily appreciate the many changes, modifications and variations may be applied to the invention as so far described without departing from the scope of the invention as defined in and by the appended claims.

What is claimed is:

1. A method of spraying of crops by airplanes with spray jets provided behind and below the airplane wings, comprising the steps of directing the spray jets downwardly at an acute angle with respect to the lower wing plane, against a winglet comprising a convex deflection surface, extending at a level distanced from the jet and tilted by an acute tangential angle with respect to the said wing plane.

2. A method as claimed in claim 1 wherein the spray jets angle is between 60–75 degrees, the deflection surface having a radius of curvature of between 20–40 cm., and the tangential angle is between 15–30 degrees.

3. A method as claimed in claim 2 wherein the width of the deflection surface is between 30–100 cm., a plurality of such surfaces being provided underneath a series of aligned spray jets.

4. A method as claimed in claim 3 wherein the deflection surface constitutes the top wall of a convergent tunnel comprising a bottom wall conforming the shape of and extending distantly from the top wall, and two opposite, planar side walls, so that rectangular inlet and outlet openings are defined.

5. A method of spraying of crops by airplanes having a series of aligned spray jets provided behind and below the airplane wings, comprising the steps of directing the spray jets at an acute angle of between 60–75 degrees with respect to the lower wing plane, against a plurality of winglets provided underneath said a series of aligned spray jets, each of said winglets comprising a convex deflection surface having a radius of curvature of between 20–40 cm., a width of between 30–100 cm. and extending at a level distanced from the jet and tilted by an acute tangential angle of between 15–30 degrees with respect to the said wing plane, the deflection surface constituting the top wall of a convergent tunnel comprising a bottom wall conforming to the shape of and extending distantly from the top wall, and two opposite, planar side walls, so that retangular inlet and outlet openings are defined, the radius of curvature of the bottom wall being about 10% less than that of the top wall.

6. A method as claimed in claim 5 wherein the cross-sectional area of the inlet opening is about twice that of the outlet opening.

7. An airplane provided with spraying equipment including a spray boom and a plurality of spray jets, the spray jets being positioned behind and below the airplane's wings and being directed downwardly at an acute angle with respect to the lower wing plane against respective winglets each comprising a convex deflection surface extending at a level distanced from the jet and tilted by an acute tangential angle with respect to the said wing plane.

8. An airplane as claimed in claim 7 wherein the spray jet angle is between 60–75 degrees, the deflection surface having a radius of curvature of between 20–40 cm., and the tangential angle of between 15–30 degrees.

9. An airplane as claimed in claim 7 wherein the width of the deflection surface is between 30–100 cm., a plurality of such surfaces being provided underneath a series of aligned spray jets.

10. An airplane provided with spraying equipment including a spray boom and a plurality of aligned spray jets, the spray jets being directed at an acute angle of between 60–75 degrees with respect to the lower wing plane against a plurality of respective winglets provided underneath said aligned spray jets, each of said winglets comprising a convex deflection surface having a radius of curvature of between 20–40 cm., a width of between 30–100 cm. and extending at a level distanced from the jet and tilted by an acute angle of between 15–30 degrees with respect to the said wing plane, the deflection surface constituting the top wall of a convergent tunnel comprising a bottom wall conforming to the shape of and extending distantly from the top wall, and two opposite, planar side walls, so that rectangular inlet and outlet openings are defined.

11. An airplane as claimed in claim 10 wherein the radius of curvature of the bottom wall is about 10% less than that of the top wall.

12. An airplane as claimed in claim 11 wherein the cross-sectional area of the inlet opening is about twice that of the outlet opening.

* * * * *